Feb. 21, 1967  P. G. TODD  3,305,764
CURRENT AND VOLTAGE REGULATED POWER SUPPLY
Filed May 24, 1963
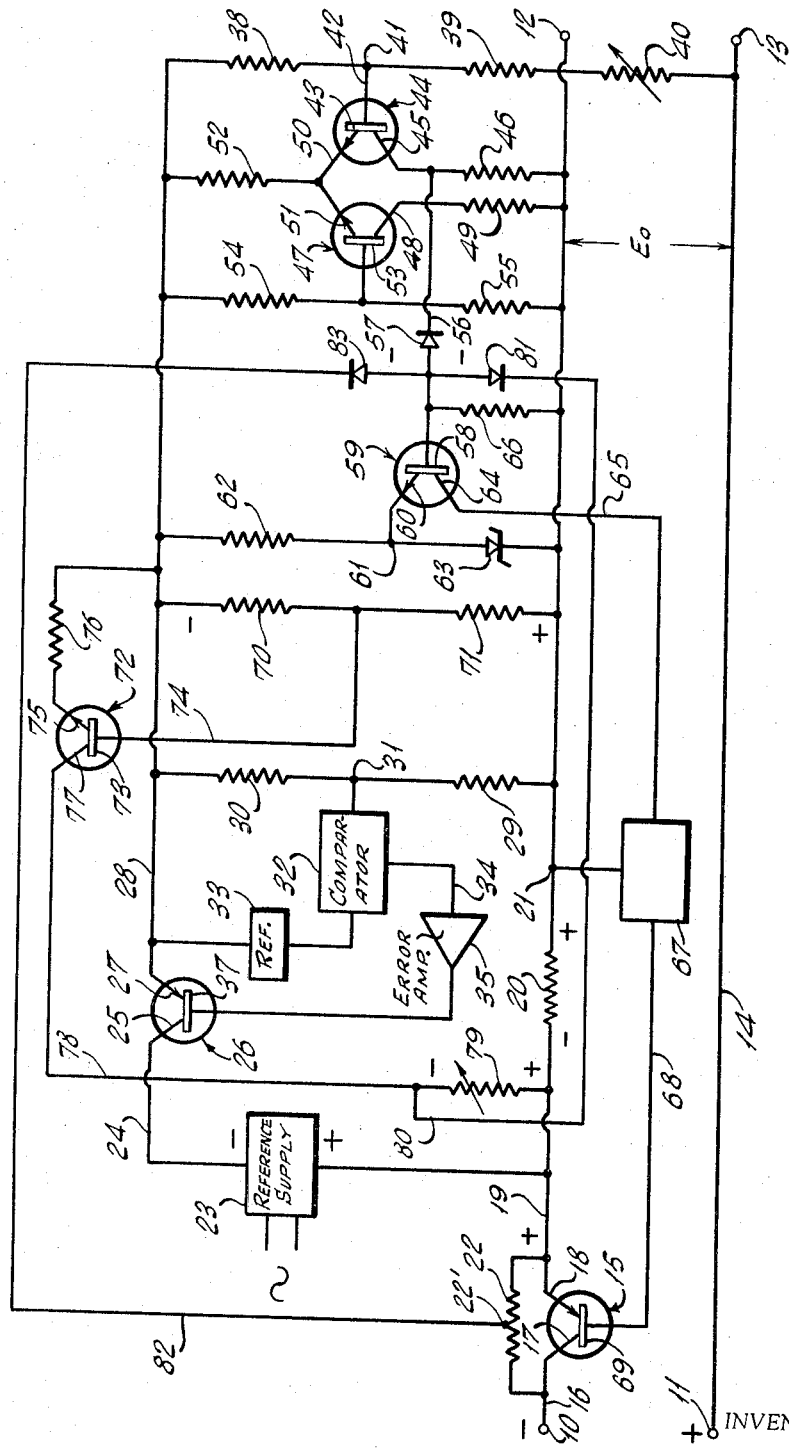
INVENTOR.
PAUL G. TODD
BY
ATTORNEY

United States Patent Office 3,305,764
Patented Feb. 21, 1967

3,305,764
CURRENT AND VOLTAGE REGULATED
POWER SUPPLY
Paul G. Todd, Great Neck, N.Y., assignor to Trygon
Electronics Inc., Roosevelt, N.Y., a corporation of New
York
Filed May 24, 1963, Ser. No. 282,915
10 Claims. (Cl. 323—9)

This invention relates to power supplies and, more specifically, to a novel and improved power supply embodying automatic voltage regulation and current limiting wherein both the magnitude of the voltage being controlled and the point at which the current is limited are separately adjustable and not influenced one by the other.

One object of the invention resides in the provision of a novel and improved power supply embodying both current and voltage regulating means and wherein said power supply will deliver a precisely regulated voltage to the load until the current demanded by the load exceeds a predetermined level, in which event, the power supply will automatically deliver a preselected maximum current independent of voltage. Should the regulator dissipation become excessive, the power supply in accordance with the invention may be further provided with means for reducing the dissipation well within the capacity of the supply.

A further object of the invention resides in a novel and improved power supply for the generation of regulated D.C. voltage with said voltage being adjustable within preselected limits and wherein adjustable means are provided for preselecting the maximum current delivered by the power supply.

The above and other objects and advantages of the invention will become more apparent from the following description and accompanying drawing, illustrating a circuit diagram of one embodiment of the invention.

The power supply now to be described constitutes an improved arrangement and organization of circuits which affords a number of important and desirable characteristics both for protection of the load being supplied by the power supply as well as for the power supply itself. As previously pointed out, the regulator provides for precise voltage regulation and for current limiting after the load current has attained a preselected value. Both the voltage control feature for setting the output voltage of the supply as well as the point at which the power supply becomes a current regulator can be independently adjusted to obtain most any desired mode of operation. In additon to the adjustable voltage and current regulating features, the power supply may also include means for automatically limiting the maximum voltage drop across the voltage regulating means during which current conduction can take place to prevent any possibility of damaging the power supply by placement of excessive load on the output terminals.

Referring now to the drawing, which illustrates the fundamental arrangement of elements of the power supply in accordance with the invention, it will be observed that only the essential circuitry has been illustrated in order to facilitate an understanding of the structure and operation of the power supply, though it will be understood that in actual practice, additional elements may be incorporated to obtain more precise voltage and current regulation and therefore circuitry utilizing such modifications will be clearly within the scope of the invention.

A source of direct current, such as rectified alternating current or the like, is applied to the terminals 10 and 11 and an output regulated voltage will be obtained at the output terminals 12 and 13. The input terminal 11 which in the instant embodiment of the invention represents the positive terminal of the input supply is connected directly to the output terminal 13 via the conductor 14. The negative terminal 10 is connected to a series regulator 15, such as a transistor, by means of a lead 16 joining the input terminal 10 to the collector 17 of the transistor. The emitter 18 is connected through a lead 19, a series resistor 20 and a lead 21 to the output terminal 12. The series regulator 15 is provided with a bridging resistor 22 which by-passes some of the current that would normally flow through the series regulator 15. It will be understood that while a single series regulator 15 is illustrated for purposes of simplicity, two or more series or series-parallel regulators may be employed to obtain improved regulating characteristics.

The utilization of the voltage dropping resistor 20 in series with the output terminal 12 affords means for providing a control signal proportional to load current which is utilized for the purpose of obtaining the current limiting function in the manner to be described.

The control circuit for developing both the voltage and current sensing signals is powered by a reference supply 23 having its positive side connected to the lead 19. It will be observed that this connection is on the input side of the series resistor 20 as this affords material advantages in the operation of the supply particularly when in the current mode of operation. The negative side of the reference supply is connected through the lead 24 to the collector 25 of a voltage regulating transitor 26. The emitter 27 of that transistor is connected to the reference supply lead 28. Regulation of the voltage appearing on the lead 28 is accomplished by a voltage divider comprising series connected resistors 29 and 30 connected between the leads 21 and 28. The centertap 31 of the voltage divider is connected to a comparator 32 which compares the voltage at the junction 31 with a fixed reference voltage produced by a reference element 33 connected between the lead 28 and the comparator. The reference element 33 may be any suitable device such as a Zener diode that will produce a constant voltage.

The error signal on the output lead 34 of the comparator is amplified by an error amplifier 35 and the output on lead 36 is fed to the base 37 of the transistor 26. Thus, the voltage on the lead 28 will be maintained at a constant level.

Voltage control of the supply during the voltage control mode of the power supply is effected by a voltage divider comprising resistors 38, 39 and 40 connected between the lead 28 and the lead 14. The resistor 40 is an adjustable resistor and by modifying its magnitude, the voltages across each of the resistors are of course modified, and accordingly, the voltage at the junction 41 between resistors 38 and 39 will also be changed. This junction provides the principal signal for effecting voltage regulation and adjustment since a change in the value of resistor 40 will modify the potential at junction 41 and the regulator 15 will then be operated to change the output voltage on the terminals 12 and 13 in a direction that will produce a voltage at junction 41 that will stabilize the control circuit. More specifically, control is attained by feeding the signal at the junction 41 via a lead 42 to the base 43 of transistor 44. The collector 45 is connected to the conductor 21 by a resistor 46. A second transistor 47 has a collector 48 connected via a resistor 49 to the lead 21, and the emitters of these two transistors 50 and 51 are connected together and through a resistor 52 to the lead 28. The base 53 of transistor 47 is connected to the centertap of a voltage divider comprising resistors 54 and 55 which is connected between the leads 28 and 21. With this arrangement, and as the voltage at the junction 41 increases positively, the transistor 44 becomes more conductive with the result that the collector 45 will become more negative.

The collector 45 of the transistor 44 is connected via the lead 56 and a diode 57 to the base 58 of a transistor 59. The diode 57 is polarized to permit a negative potential on the lead 56 to flow through the diode 57 and to the base 58 which functions to increase the impedance of the transistor 59. The emitter 60 of the transistor 59 is connected to the junction 61 between a series connected resistor 62 and a Zener diode 63, the resistor and diode being connected in series between the leads 28 and 21. With a fixed reference voltage produced by the Zener diode at the terminal 61, as the base of the transissistor 59 is made more negative, the impedance of the transistor will be modified so that the current flowing between the emitter and the collector 64 and through the lead 65 will be reduced. The base 58 is provided with a return circuit to the lead 21 in the form of a resistor 66, since the input to the base comprises diodes which present conductive circuits for the base only when the voltages applied therethrough are of a particular polarity. The output signal on the lead 65 may be fed through a suitable intervening amplifier 67, and the output of the amplifier 67 is fed by a lead 68 to the base 69 of the transistor 15. By properly phasing the circuits, as the base 58 of transistor 59 becomes more negative, the base 69 of transistor 15 will become more positive and thereby increase the impedance of the transistor 15 to reduce the voltage applied to the output terminal 12. Thus, with changes in potential between the terminals 12 and 13, corresponding changes in the potential of the junction 41 will be produced and these changes will in turn influence the operation of the series regulator 15 to modify the output voltage and maintain it at a constant magnitude.

As previously pointed out, the resistor 20 was included in series with the lead 21 to provide a device for sensing current in the load. To effect voltage regulation, however, it is necessary that the reference voltage be maintained constant between the leads 28 and 21 so that the voltage drop produced by the resistor 20 does not influence the voltage controlling function of the power supply. When the power supply operates in the current limiting mode, that is, after the output current attains a selected magnitude, the amplifier will automatically limit the current so that it cannot exceed such predetermined value. If the positive side of the reference supply 23 was returned to the lead 21, then the current flowing through the voltage divider comprising resistors 38, 39 and 40 would also flow through the resistor 20 and any sensing device used to sense the voltage drop across the resistor 20 would be influenced both by the current in the load as well as the current through the last said voltage divider. By returning the positive side of the reference supply 23 to the lead 19, the current through the voltage divider (resistors 38, 39 and 40) flows through the transistor 26 and the reference supply to the lead 19. Thus, any variations in current through the voltage divider will not influence the voltage drop across the resistor 20, and operation of the power supply in the current limiting mode will be a function solely of the load current and completely independent of changes in current through the output voltage divider which may be substantial during the current mode of operation.

Current limiting is obtained by means of the circuit which includes a voltage divider having resistors 70 and 71 connected in series between the leads 28 and 21 and a transistor 72 having its base 73 connected via the lead 74 to the junction of resistors 70 and 71. The emitter 75 of the transistor 72 is connected by a resistor 76 to the lead 28. This arrangement provides in effect a constant current source, and the output obtained from the collector 77 is connected through the lead 78 and through a variable resistor 79 to the lead 19. Since the transistor 72 provides a constant current source, changes in the magnitude of the resistance 79 will effect the potential on the lead 78. However, the sum of the voltage drops in resistors 20 and 79 as compared to the lead 21 will be determined by the current flowing through the resistor 20 and the magnitude of the resistance 79. The sum of the two voltage drops is fed by the lead 80 and a diode 81 to the base 58 of the transistor 59. Since the polarities of the voltage drops in resistors 79 and 20 are arranged so that, as these drops increase, the potential of the lead 80 will become more negative, then as they become more negative, cathode of diode 81 will be made more negative. If the current in the lead increases to a degree whereby the negative voltage applied to the cathode of diode 81 exceeds the negative voltage applied to the cathode of diode 57, then the current controlling mode will function to prevent any increase in voltage across the output terminals 12 and 13, and as a matter of fact, may decrease the voltage so that the current in the load will not increase beyond a predetermined value. The point at which the power supply goes into the current mode of operation is determined by the resistance of the variable resistor 79. By increasing the resistance 79 and increasing the voltage drop across it, the maximum current that will be delivered by the supply will be decreased, while decreasing the resistor 79 will increase the maximum current delivered by the supply before the circuit goes into the current mode of operation.

With the supply as thus far described, the magnitude of the output voltage will be determined by the setting of the control 40 and a uniform output voltage will be delivered until the current drain attains a predetermined magnitude as determined by the setting of the variable resistor 79. When this current level is reached, any tendency of the load to increase the current drain on the supply will result in an automatic decrease in voltage to maintain the output current at a constant maximum value. Should a short circuit be applied between the terminals 12 and 13, the voltage will theoretically fall to zero or at least approach zero. It will also be observed that during the current limiting mode, current control is effected solely as the result of the load current flowing through the resistor 20, and the output voltage divider will have no influence whatsoever on the operation of the supply.

The power supply in accordance with the invention may also include means for limiting the maximum power loss in the regulator 15 to prevent any possibility of overloading the regulating means. For this purpose, the resistor 22, bridging the transistor 15, is provided with a tap 22'. This tap is connected via a lead 82 and a diode 83 to the base 58 of the transistor 59. As the voltage across regulator 15 increases, the tap 22' on the resistor 22 will become more negative, and this negative voltage is fed to the cathode of diode 83. If, at any time, this negative voltage reaches a magnitude which indicates an overload condition on the regulator 15, this increase in negative voltage will be applied to the base 58 and immediately result in increasing the impedance of the regulator to reduce the current flowing through the lead 21 and the load. In this design of the power supply, the regulator 15 and any associated regulating device used in conjunction therewith would be designed to handle a predetermined maximum current plus a suitable safety factor so that this safety circuit would not normally produce a negative voltage on the base 58 in excess of the voltages applied through the diodes 57 and 81. However, in the event of a sudden short circuit or if the current limiting mode of operation should, for any reason or other, fail to function, the protective circuit involving the resistor 22 and the diode 83 will immediately assume control and drop the voltage to a point that would prevent damage to the regulating means.

While only one embodiment of the invention has been illustrated and described, it is apparent that alterations, modifications and changes may be made without departing from the true scope and spirit thereof as defined by the appended claims.

What is claimed is:

1. A power supply comprising a source of direct current, a pair of output terminals, voltage regulating means connecting said source to said output terminals, means including a regulated reference voltage interconnected with said output terminals and said voltage regulating means for adjusting said output voltage to a selected value and feeding a voltage deviation signal to said voltage regulating means to maintain the output voltage at a predetermined value, current sensing means including an impedance in series with said voltage regulating means and one output terminal for producing a voltage signal proportional to current adjustable means producing a selected voltage, connection between the last said means and said current sensing means to produce a resultant voltage, and means feeding the last said resultant voltage to said voltage regulating means, the last said voltage signal limiting the output current to said load independently of changes in the voltage deviation signal.

2. A power supply according to claim 1 wherein said supply further includes means sensing the voltage drop across said voltage regulating means and producing a signal in response thereto and means feeding said signal back to said voltage regulating means to limit the voltage drop across the regulating means independently of said voltage and current sensing signals.

3. A power supply comprising a source of voltage to be regulated, a pair of output terminals, voltage regulating means connected between said source and said output terminals, means sensing the voltage on said output voltage terminals and producing a unidirectional error signal in response to deviations of the output voltage from a preselected output voltage, means feeding said error signal to said voltage regulator to modify the output signal until said error signal is at a preselected value, load current sensing means producing a unidirectional signal proportional to the current drain on said output terminals and independent of the current drain of said voltage sensing means, and means feeding the last said signal to said regulating means in conjunction with said error signal whereupon said current signal upon attainment of a magnitude in excess of the preselected value of said voltage error signal limits further increase in current notwithstanding the load demand.

4. A power supply according to claim 3 wherein said load current sensing means comprises a resistor connected between said voltage regulating means and an output terminal, and said voltage sensing means includes a reference supply having one terminal connected to the supply side of said resistor, an adjustable voltage divider connected between the other terminal of said reference supply and the other output terminal, a tap on voltage divider and means including a diode connected to said tap and producing a unidirectional error signal.

5. A power supply according to claim 4 including means connected with said voltage regulating means and producing a signal proportional to the voltage drop across said regulating means, and means including a diode feeding the last said signal to the output side of the error signal diode.

6. A power supply comprising a source of voltage to be regulated, a pair of output terminals, series connected voltage regulating means and a resistor connected between said source and one output terminal, a connection between said source and the other output terminal, a reference source of voltage having one side connected to the junction of said regulator and series connected resistor, output voltage deviation sensing means connected between the other of the output terminals and the other side of said reference source, the last said means producing an error signal, means feeding said error signal to said voltage regulating means to modify the magnitude of the output voltage, current sensing means interconnected with said resistor and producing a signal proportional to the current flowing therethrough and means connecting said regulator and said current sensing means whereby the last said signal will actuate said regulator to prevent the current through said resistor from exceeding said predetermined magnitude.

7. A power supply according to claim 6 wherein said signals are D.C. and said feeding means and said connecting means each include a diode.

8. A power supply comprising a D.C. source of voltage to be regulated and having a pair of terminals, a pair of output terminals, at least one series regulator and a series connected resistor connected between one of said source terminals and one of said output terminals, a connection between the other source terminal and the other output terminal, a D.C. reference supply having a pair of output terminals, a connection between one terminal of the reference supply and the junction between said series regulator and said resistor with the voltages of the first said D.C. source and said reference supply being in additive relation, an adjustable voltage divider connected between the other terminal of said reference supply and the other output terminal, a tap on said voltage divider producing a voltage proportional to the voltage appearing across the output terminals, amplifying means connected to said voltage divider tap and producing a unidirectional voltage having a magnitude variable in accordance with changes in the voltage across said output terminals, rectifying means in series with the output of said amplifying means, second amplifying means connected between said rectifier and said regulator to modify the impedance of said regulator in accordance with variations in the voltage across said output terminals to maintain the last said voltage at a preselected magnitude, means interconnected with said reference supply and producing a constant current source of voltage, a variable resistor connected between said current source and the junction between said series regulator and said resistor, rectifying means connected between the junction of said constant current source and said variable resistor and said second amplifying means for applying a unidirectional voltage of the same polarity as the first said unidirectional voltage to the input of said second amplifying means, said second unidirectional voltage being a function of the load current through said series resistor and the voltage drop across said variable resistor whereby said second unidirectional voltage upon attaining a magnitude greater than the magnitude of the first said unidirectional voltage as a result of the current flowing through said series resistor functions to increase the impedance of said series regulator and limit the maximum current to a load connected to said output terminals to a predetermined maximum value, said maximum current control being independent of the current flowing through said voltage divider.

9. A power supply according to claim 8 including means sensing the voltage drop across said series regulator and producing a unidirectional output voltage and rectifying means connecting the last said means with said second amplifying means and operable to actuate said series regulating means to limit the maximum voltage drop thereacross.

10. A power supply according to claim 8 wherein the other terminal of said reference supply is connected to said voltage divider through a series regulator, a second voltage divider is connected between the output of the last said series regulator and the output side of said series resistor to produce a voltage variable in accordance with changes in the voltage of said reference supply, a second constant reference voltage, a comparator sensing the difference between said second constant reference voltage and variations in the voltage and variations in the voltage produced by said second voltage divider and means connecting said comparator to the reference supply series regulator for maintaining the voltage between the output of said reference supply series regulator and the output side of said series resistor constant.

References Cited by the Examiner
UNITED STATES PATENTS

| | | | |
|---|---|---|---|
| 2,979,653 | 4/1961 | Wilcox | 323—22 |
| 3,076,135 | 1/1963 | Farnsworth | 323—22 |
| 3,105,188 | 9/1963 | Harrison | 323—22 |

JOHN F. COUCH, *Primary Examiner.*

K. D. MOORE, *Assistant Examiner.*